United States Patent

Arvelo, Jr.

[11] Patent Number: 5,870,024
[45] Date of Patent: Feb. 9, 1999

[54] HOT WATER HEATER LEAK PROTECTION SYSTEM

[76] Inventor: Hector E. Arvelo, Jr., 82 Hillside Ave., Woodbridge, N.J. 07095

[21] Appl. No.: 883,563

[22] Filed: Jun. 26, 1997

[51] Int. Cl.⁶ .................................................. G08B 21/00
[52] U.S. Cl. ......................... 340/605; 340/618; 340/623; 340/624; 200/84 R
[58] Field of Search .................... 340/605, 616, 340/623, 604, 620, 618, 624, 225, 625; 200/84 R; 73/305, 311, 314, 315, 322.5

[56] References Cited

U.S. PATENT DOCUMENTS

| | | | |
|---|---|---|---|
| 4,020,481 | 4/1977 | Nakagawa | 340/244 E |
| 5,188,143 | 2/1993 | Krebs | 137/312 |
| 5,240,022 | 8/1993 | Franklin | 137/1 |
| 5,315,291 | 5/1994 | Furr | 340/605 |
| 5,334,973 | 8/1994 | Furr | 340/605 |
| 5,345,224 | 9/1994 | Brown | 340/605 |
| 5,368,263 | 11/1994 | Harrison | 248/146 |
| 5,632,302 | 5/1997 | Lenoir, Jr. | 137/312 |
| 5,655,561 | 8/1997 | Wendel et al. | 137/79 |
| 5,656,999 | 8/1997 | Campbell | 340/605 |
| 5,685,509 | 11/1997 | Harrison | 248/146 |

Primary Examiner—Jeffery A. Hofsass
Assistant Examiner—Toan N. Pham

[57] ABSTRACT

A new HOT WATER HEATER LEAK PROTECTION SYSTEM for PREVENTING OVERFLOW OF HOT WATER IN IF A HOT WATER HEATER BREAKS. The inventive device includes an overflow tank having a cylindrical stand positioned centrally thereon for positioning a hot water heater thereon. The overflow tank has a supplemental housing secured therein. The supplemental housing has an opening in a lower portion thereof to allow water to flow therethrough. An automatic float switch is positioned within the supplemental housing. A pump is disposed within the supplemental housing. The pump is in communication with the automatic float switch. A shut off valve is disposed within a housing coupled to a water line leading into the hot water heater. The shut off valve is in communication with the pump and the automatic float switch.

1 Claim, 2 Drawing Sheets

HOT WATER HEATER LEAK PROTECTION SYSTEM

BACKGROUND OF THE INVENTION

1. Field of the Invention

The present invention relates to OVERFLOW SYSTEMS and more particularly pertains to a new HOT WATER HEATER LEAK PROTECTION SYSTEM for PREVENTING OVERFLOW OF HOT WATER IF A HOT WATER HEATER BREAKS.

2. Description of the Prior Art

The use of OVERFLOW SYSTEMS is known in the prior art. More specifically, OVERFLOW SYSTEMS heretofore devised and utilized are known to consist basically of familiar, expected and obvious structural configurations, notwithstanding the myriad of designs encompassed by the crowded prior art which have been developed for the fulfillment of countless objectives and requirements.

Known prior art OVERFLOW SYSTEMS include U. S. Pat. No. 5,334,973 to Furr; U.S. Pat. No. 5,029,605 to Dowling et al.; U.S. Pat. No. 4,805,662 to Moody; U.S. Pat. No. 4,987,409 to Jackson; U.S. Pat. No. 4,569,312 to Ridell et al.; and U.S. Pat. No. Des. 353,436 to Hess.

While these devices fulfill their respective, particular objectives and requirements, the aforementioned patents do not disclose a new HOT WATER HEATER LEAK PROTECTION SYSTEM. The inventive device includes an overflow tank having a cylindrical stand positioned centrally thereon for positioning a hot water heater thereon. The overflow tank has a supplemental housing secured therein. The supplemental housing has an opening in a lower portion thereof to allow water to flow therethrough. An automatic float switch is positioned within the supplemental housing. A pump is disposed within the supplemental housing. The pump is in communication with the automatic float switch. A shut off valve is disposed within a housing coupled to a water line leading into the hot water heater. The shut off valve is in communication with the pump and the automatic float switch.

In these respects, the HOT WATER HEATER LEAK PROTECTION SYSTEM according to the present invention substantially departs from the conventional concepts and designs of the prior art, and in so doing provides an apparatus primarily developed for PREVENTING OVERFLOW OF HOT WATER IF A HOT WATER HEATER BREAKS.

SUMMARY OF THE INVENTION

In view of the foregoing disadvantages inherent in the known types of OVERFLOW SYSTEMS now present in the prior art, the present invention provides a new HOT WATER HEATER LEAK PROTECTION SYSTEM construction wherein the same can be utilized for PREVENTING OVERFLOW OF HOT WATER IF A HOT WATER HEATER BREAKS.

The general preventing overflow of hot water in if a hot water heater breaks of the present invention, which will be described subsequently in greater detail, is to provide a new HOT WATER HEATER LEAK PROTECTION SYSTEM apparatus and method which has many of the advantages of the OVERFLOW SYSTEMS mentioned heretofore and many novel features that result in a new HOT WATER HEATER LEAK PROTECTION SYSTEM which is not anticipated, rendered obvious, suggested, or even implied by any of the prior art OVERFLOW SYSTEMS, either alone or in any combination thereof.

To attain this, the present invention generally comprises an overflow tank having a cylindrical configuration. The overflow tank has an open upper end, a closed lower end and a cylindrical side wall therebetween. The tank has a diameter of at least thirty inches. The overflow tank has a cylindrical stand positioned centrally on the closed lower end thereof for positioning a hot water heater thereon. The cylindrical stand has a height slightly less than a height of the overflow tank. The overflow tank has a supplemental housing secured to the closed lower end thereof and in contact with the cylindrical side wall. The supplemental housing has an opening in a lower portion thereof to allow water to flow therethrough. An automatic float switch is positioned within the supplemental housing. The float switch includes a float portion disposed within an interior channel within the supplemental housing. The float switch includes a switch portion positioned atop the channel. The switch portion has an activation button extending downwardly within the channel. A pump is disposed within the supplemental housing. The pump is in communication with the automatic float switch. The pump has an interior tube extending through the opening in the lower portion of the supplemental housing. The pump has an exterior tube extending outwardly of the cylindrical tank and into an existing drain. A shut off valve is disposed within a housing coupled to a water line leading into the hot water heater. The shut off valve is in communication with the pump and the automatic float switch. A reset button is disposed within the housing coupled to the water line leading into the hot water heater.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the preventing overflow of hot water in if a hot water heater breaks of description and should not be regarded as limiting.

As such, those skilled in the art will appreciate that the conception, upon which this disclosure is based, may readily be utilized as a basis for the designing of other structures, methods and systems for carrying out the several preventing overflow of hot water in if a hot water heater breaks of the present invention. It is important, therefore, that the claims be regarded as including such equivalent constructions insofar as they do not depart from the spirit and scope of the present invention.

Further, the preventing overflow of hot water in if a hot water heater breaks of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new HOT WATER HEATER LEAK PROTECTION SYSTEM apparatus and method which has many of the advantages of the OVERFLOW SYSTEMS mentioned heretofore and many novel features that result in a new HOT WATER HEATER LEAK PROTECTION SYSTEM which is not anticipated, rendered obvious, suggested, or even implied by any of the prior art OVERFLOW SYSTEMS, either alone or in any combination thereof.

It is another object of the present invention to provide a new HOT WATER HEATER LEAK PROTECTION SYSTEM which may be easily and efficiently manufactured and marketed.

It is a further object of the present invention to provide a new HOT WATER HEATER LEAK PROTECTION SYSTEM which is of a durable and reliable construction.

An even further object of the present invention is to provide a new HOT WATER HEATER LEAK PROTECTION SYSTEM which is susceptible of a low cost of manufacture with regard to both materials and labor, and which accordingly is then susceptible of low prices of sale to the consuming public, thereby making such HOT WATER HEATER LEAK PROTECTION SYSTEM economically available to the buying public.

Still yet another object of the present invention is to provide a new HOT WATER HEATER LEAK PROTECTION SYSTEM which provides in the apparatuses and methods of the prior art some of the advantages thereof, while simultaneously overcoming some of the disadvantages normally associated therewith.

Still another object of the present invention is to provide a new HOT WATER HEATER LEAK PROTECTION SYSTEM for PREVENTING OVERFLOW OF HOT WATER IF A HOT WATER HEATER BREAKS.

Yet another object of the present invention is to provide a new HOT WATER HEATER LEAK PROTECTION SYSTEM which includes an overflow tank having a cylindrical stand positioned centrally thereon for positioning a hot water heater thereon. The overflow tank has a supplemental housing secured therein. The supplemental housing has an opening in a lower portion thereof to allow water to flow therethrough. An automatic float switch is positioned within the supplemental housing. A pump is disposed within the supplemental housing. The pump is in communication with the automatic float switch. A shut off valve is disposed within a housing coupled to a water line leading into the hot water heater. The shut off valve is in communication with the pump and the automatic float switch.

Still yet another object of the present invention is to provide a new HOT WATER HEATER LEAK PROTECTION SYSTEM that is only reactivated via a manual switch.

Even still another object of the present invention is to provide a new HOT WATER HEATER LEAK PROTECTION SYSTEM that prevents water damage and waste caused by a leaking water heater.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
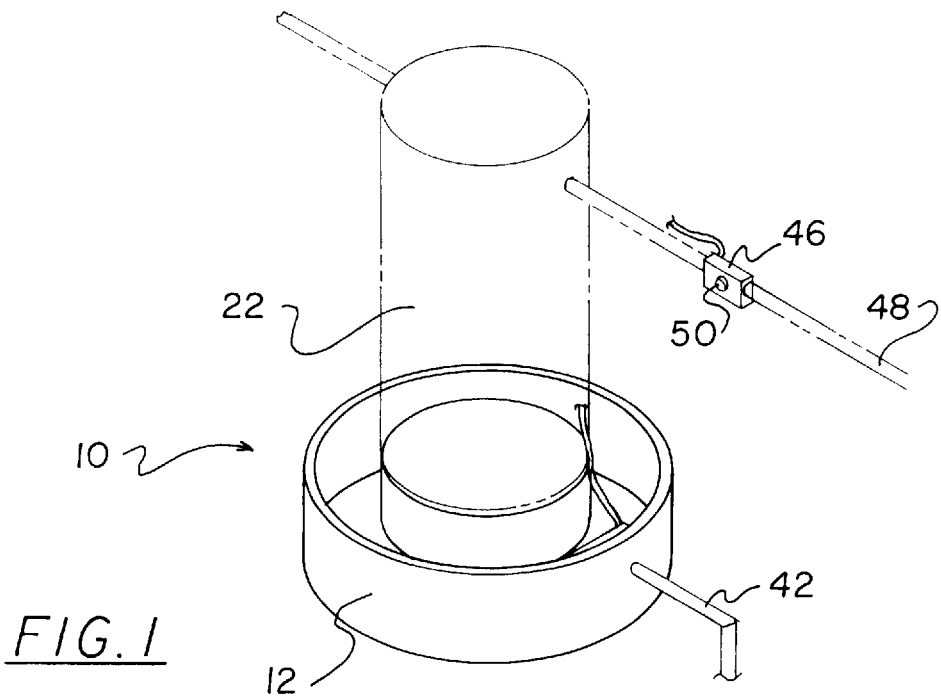
FIG. 1 is a perspective view of a new HOT WATER HEATER LEAK PROTECTION SYSTEM according to the present invention.
Figure 2:
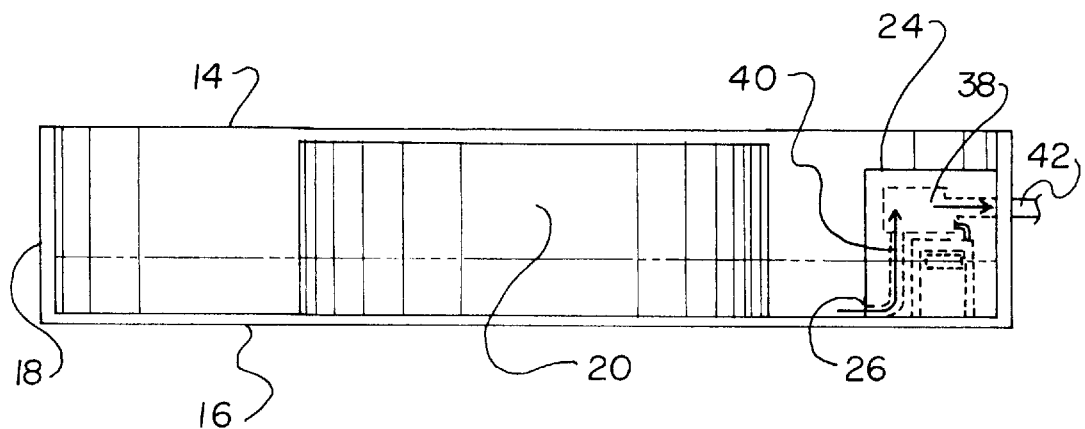
FIG. 2 is a cross-sectional side view of the present invention.
Figure 3:
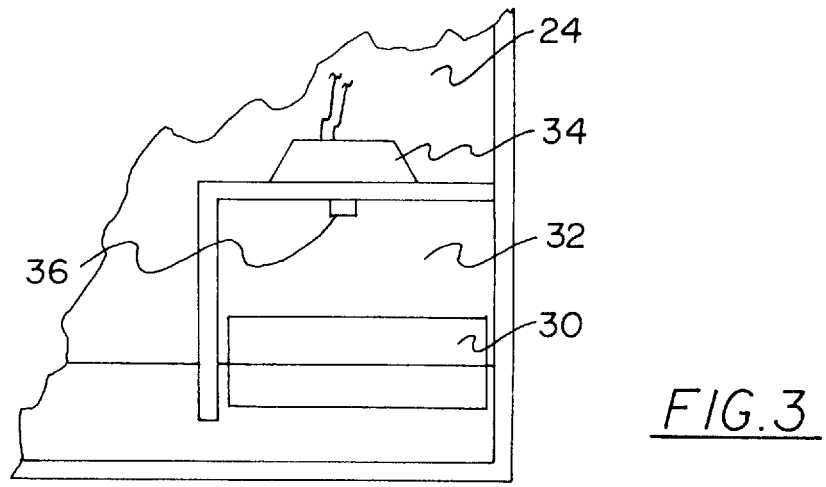
FIG. 3 is a sectional view of the present invention illustrating the float switch.
Figure 4:
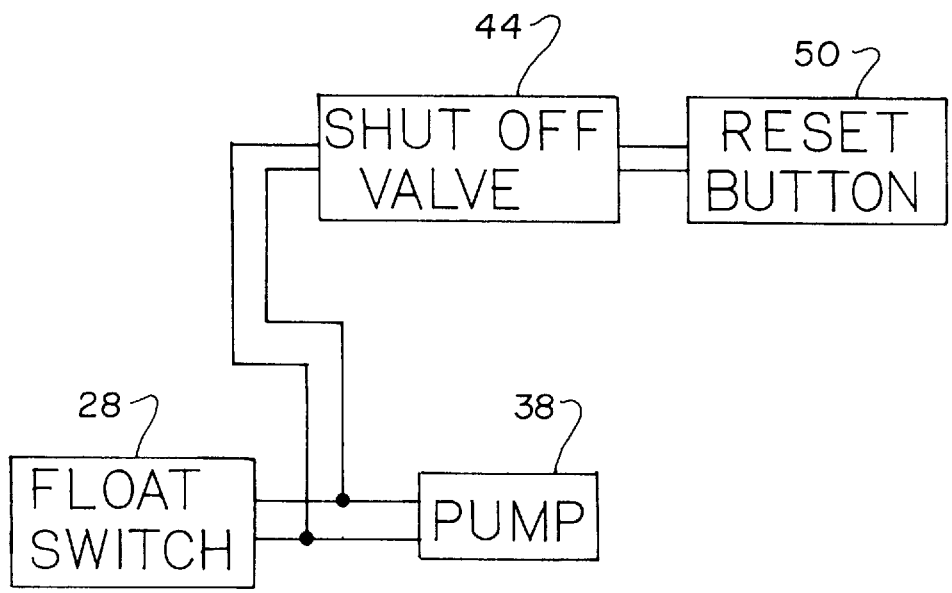
FIG. 4 is a schematic view of the present invention.

With reference now to the drawings, and in particular to FIGS. 1 through 4 thereof, a new HOT WATER HEATER LEAK PROTECTION SYSTEM embodying the principles and concepts of the present invention and generally designated by the reference numeral 10 will be described.

As best illustrated in FIGS. 1 through 4, the HOT WATER HEATER LEAK PROTECTION SYSTEM 10 comprises an overflow tank 12 having a cylindrical configuration. The overflow tank 12 has an open upper end 14, a closed lower end 16 and a cylindrical side wall 18 therebetween. The tank 12 has a diameter of at least thirty inches. This size of tank 12 is used for standard sized hot water heaters. When larger hot water heaters are used, larger tanks will be utilized. The tank 12 also has a height at least eight inches high. The overflow tank 12 has a cylindrical stand 20 positioned centrally on the closed lower end 16 thereof for positioning a hot water heater 22 thereon. The cylindrical stand 20 has a height slightly less than a height of the overflow tank 12. The overflow tank 12 has a supplemental housing 24 secured to the closed lower end 16 thereof and in contact with the cylindrical side wall 18. The supplemental housing 24 has an opening 26 in a lower portion thereof to allow water to flow therethrough.

An automatic float switch 28 is positioned within the supplemental housing 24. The float switch 28 includes a float portion 30 disposed within an interior channel 32 within the supplemental housing 24. The float switch 28 includes a switch portion 34 positioned atop the channel 32. The switch portion 34 has an activation button 36 extending downwardly within the channel 32. Water that is leaked from the hot water heater 22 will enter into the supplemental housing 24 whereby the water will cause the float portion 30 to raise upwardly within the channel 32.

A pump 38 is disposed within the supplemental housing 24. The pump 38 is in communication with the automatic float switch 28. The pump 38 has an interior tube 40 extending through the opening 26 in the lower portion of the supplemental housing 24. The pump 38 has an exterior tube 42 extending outwardly of the cylindrical tank 12 and into an existing drain. Once the float portion 30 reaches the top of the channel 32, it will contact the activation button 34 which will activate the pump 38 to pump the water out from within the cylindrical tank 12.

A shut off valve 44 is disposed within a housing 46 coupled to a water line 48 leading into the hot water heater 22. The shut off valve 44 is in communication with the pump 38 and the automatic float switch 28. Once the pump 38 is activated, the shut off valve 44 will close to prevent water from being delivered to the hot water heater 22.

A reset button 50 is disposed within the housing 46 coupled to the water line 48 leading into the hot water heater 22. Once the shut off valve 44 has closed, a person must manually press the reset button 50 in order to allow the flow of water to the hot water heater 22.

In use, if the casing of the hot water heater 22 breaks, water will flow into the cylindrical tank 12. The automatic float switch 28 will activate the pump 38 which will pump water out of the cylindrical tank 12 into the drain thereby relieving the water from the tank 12, and sending a message to the shut off valve 44. This will preclude water from entering into the hot water tank 22. Additionally, the system 10 could be equipped with an alarm to alert the homeowner of the problem. Water will then only flow to the hot water heater 22 after the reset button 50 is pressed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hot water heater leak protection system comprising, in combination:

an overflow tank, the overflow tank having a generally cylindrical configuration, the overflow tank having an open upper end, a closed lower end and a cylindrical side wall between the upper end and the lower end, the overflow tank having a diameter of at least thirty inches, the overflow tank having a cylindrical stand positioned centrally on the closed lower end, the cylindrical stand being for positioning a hot water heater thereon, the cylindrical stand having a height slightly less than a height of the overflow tank, the overflow tank having a supplemental housing secured to the closed lower end, said supplemental housing being in contact with the cylindrical side wall, the supplemental housing having an opening in a lower portion of the supplemental housing, said opening in the lower portion of the supplemental housing being for allowing water to flow therethrough;

an automatic float switch, the automatic float switch being positioned within the supplemental housing, the float switch including a float portion, the float portion being disposed in an interior channel in the supplemental housing, the float switch including a switch portion, the switch portion being positioned atop the channel, the switch portion having an activation button extending downwardly in the channel;

a pump, the pump being disposed in the supplemental housing, the pump being in communication with the automatic float switch, the pump having an interior tube, the interior tube extending through the opening in the lower portion of the supplemental housing, the pump having an exterior tube, the exterior tube extending outwardly of the cylindrical tank and into an existing drain;

a shut off valve, the shut off valve being disposed within a shut off valve housing, the shut off valve housing being coupled to a water line leading into the hot water heater, the shut off valve being in communication with the pump and the automatic float switch, wherein the shut off valve is adapted to cut off the water upon activation of the pump which is effected by the automatic float switch; and a reset button, the reset button being disposed in the shut off valve housing.

* * * * *